United States Patent
Lu et al.

(10) Patent No.: US 11,393,640 B2
(45) Date of Patent: Jul. 19, 2022

(54) WATER BASED HYBRID LITHIUM ION CAPACITOR BATTERY HAVING A WATER-IN-SALT ELECTROLYTE

(71) Applicant: GM Global Technology Operations LLC, Detroit, MI (US)

(72) Inventors: Yong Lu, Shanghai (CN); Qili Su, Shanghai (CN); Haijing Liu, Shanghai (CN); Jingjing Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 16/646,849

(22) PCT Filed: Jun. 20, 2018

(86) PCT No.: PCT/CN2018/091913
§ 371 (c)(1),
(2) Date: Mar. 12, 2020

(87) PCT Pub. No.: WO2019/241917
PCT Pub. Date: Dec. 26, 2019

(65) Prior Publication Data
US 2020/0279695 A1  Sep. 3, 2020

(51) Int. Cl.
*H01M 4/02* (2006.01)
*H01G 11/06* (2013.01)
*H01G 11/46* (2013.01)
*H01G 11/50* (2013.01)
*H01G 11/62* (2013.01)

(52) U.S. Cl.
CPC ............ *H01G 11/06* (2013.01); *H01G 11/46* (2013.01); *H01G 11/50* (2013.01); *H01G 11/62* (2013.01)

(58) Field of Classification Search
CPC ...................................................... H01M 4/02
See application file for complete search history.

(56) References Cited

U.S. PATENT DOCUMENTS

| | | |
|---|---|---|
| 6,252,762 B1 | 6/2001 | Amatucci |
| 6,468,698 B1 | 10/2002 | Hamano et al. |
| 2010/0319187 A1 | 12/2010 | Kim et al. |
| 2012/0308872 A1 | 12/2012 | Huang |
| 2017/0279159 A1* | 9/2017 | Suyama ............ H01M 4/5825 |
| 2018/0375147 A1* | 12/2018 | Iarochenko ....... H01M 10/0436 |

FOREIGN PATENT DOCUMENTS

CN  105826520 A  8/2016

\* cited by examiner

*Primary Examiner* — Jacob B Marks
(74) *Attorney, Agent, or Firm* — Vivacqua Crane PLLC

(57) ABSTRACT

A battery having a plurality of electrodes immersed in a water-in-salt electrolytic solution is disclosed. The water-in-salt electrolytic solution includes a sufficient amount of a lithium salt disposed in an aqueous solvent, at least 14 moles of lithium salt per kg of aqueous solvent, such that a dissociated lithium ion is solvated by less than 4 water molecules. The plurality of electrodes includes a first type electrode, a second type electrode, and a third type electrode selectively assembled in a predetermined order of arrangement into an electrode stack assembly. The first type electrode includes an activated carbon, the second type electrodes include one of a lithium manganese oxide (LMO) and titanium dioxide ($TiO_2$), and the third type electrodes include the other of the LMO and $TiO_2$. The first type electrode may be that of a cathode and/or anode.

12 Claims, 8 Drawing Sheets

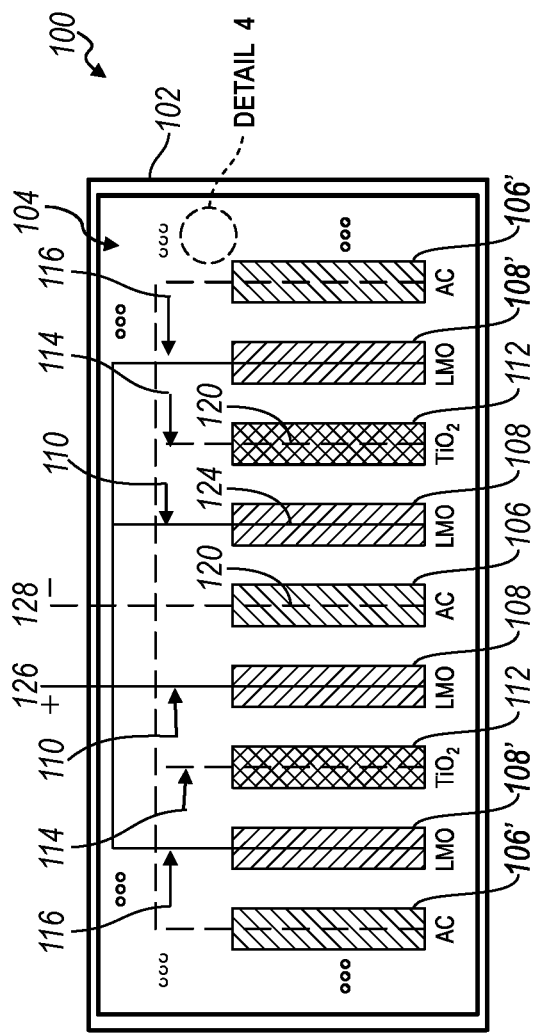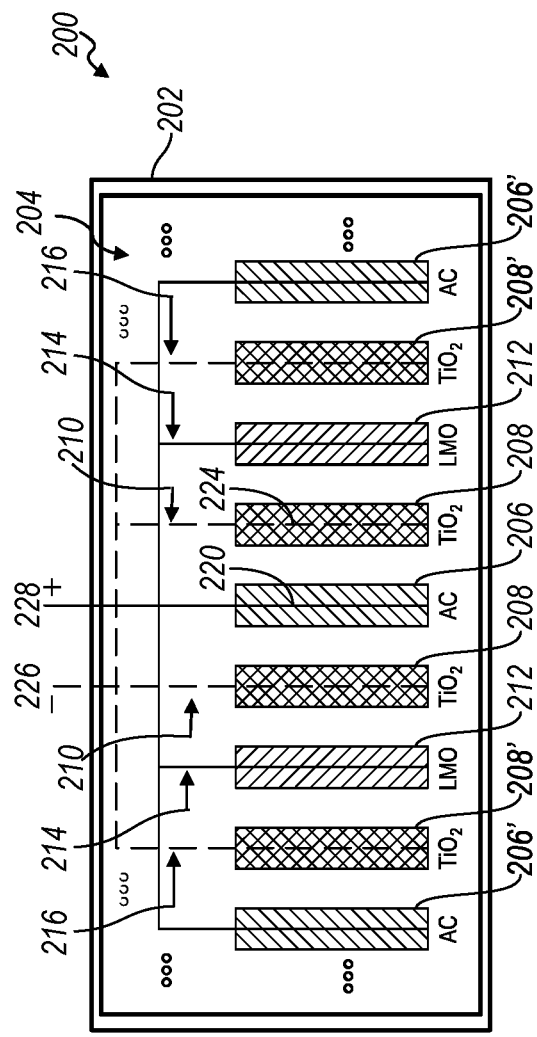
FIG. 1
FIG. 2

WATER BASED HYBRID LITHIUM ION CAPACITOR BATTERY HAVING A WATER-IN-SALT ELECTROLYTE

INTRODUCTION

The present disclosure relates generally to a hybrid lithium ion capacitor battery, more particularly to a hybrid lithium ion capacitor battery having a water-in-salt electrolyte.

A typical lithium-ion battery is formed of an anode layer, a cathode layer, a separator layer separating the anode layer and cathode layer, a positive current collector, and a negative current collector. The lithium-ion battery also includes an electrolytic solution formulated to carry lithium cations (Li+) from the anode to the cathode during the discharge process, and vice versa, through the porous separator layer. The movement of the Li+ creates free electrons (e−) in the anode which creates a charge at the positive current collector. An electrical current then flows from the current collector through a device being powered, such as cell phone, computer, etc., to the positive current collector. The separator layer blocks the flow of electrons inside the battery.

Organic electrolytes are formulated for use in lithium batteries to meet performance criteria such as conductivity, operating temperature range, and voltage stability range. Organic electrolytes include combinations of linear and cyclic alkyl carbonates that make possible the use of Li+ as the anodic active component and results in the high power and energy densities characteristic of the Li-ion chemistries. However, these organic electrolytes may have higher than desirable volatility and reactivity for certain applications.

Due to the desirable characteristics of lithium ion batteries, such as the ability to hold a relatively high energy density as compared to nickel metal hydride, nickel cadmium, or lead acid batteries, and the ability to be completely or partially charged and discharged over many cycles without retaining a memory effect, the use of lithium ion batteries is continuing to be expanded to larger electric equipment such as hybrid vehicles and electric vehicles. Thus there is a continuing need to increase the energy density, which is the amount of energy that the battery can store with respect to its mass, and the power density, which is the amount of power that can be generated by the battery with respect to its mass, for improved vehicle performance with respect to weight savings and range.

Thus, while lithium ion batteries achieve their intended purpose, there is a continuing need to increase the energy density and power density of lithium ion batteries. There is also a need for electrolytic solutions that are less volatile and reactive as comparted to organic electrolytes over a greater range of operating conditions while providing the desired improved energy and power densities.

SUMMARY

According to several aspects, a battery having a plurality of electrodes immersed in a water-in-salt electrolytic solution is disclosed. The water-in-salt electrolytic solution includes a sufficient amount of a lithium salt disposed in an aqueous solvent such that a lithium ion dissociated from the lithium salt within the aqueous solvent is solvated by less than 4 water molecules.

In an additional aspect of the present disclosure, the plurality of electrodes includes a first type electrode and a first pair of second type electrodes. The first type electrode is sandwiched between the pair of the second type electrodes thus forming a 3 electrode stack assembly.

In another aspect of the present disclosure, the plurality of electrodes further includes a pair of third type electrodes sandwiching the 3 electrode stack assembly thus forming a 5 electrode stack assembly.

In another aspect of the present disclosure, the plurality of electrodes further includes a second pair of second type electrodes sandwiching the 5 electrode stack assembly thus forming a 7 electrode stack assembly, and a pair of first type electrodes sandwiching the 7 electrode stack assembly thus forming a 9 electrode stack assembly. The first type electrode includes an activated carbon material. The second type electrodes include one of a lithium manganese oxide (LMO) and a titanium dioxide ($TiO_2$), and the third type electrodes include the other of the LMO and $TiO_2$.

In another aspect of the present disclosure, the first type electrode and the third type electrode are anodes. The first type electrode includes one of an activated carbon and a titanium dioxide ($TIO_2$), and the third type electrode comprise the other one of the activated carbon and the $TIO_2$. The second type electrode is a cathode comprising a LMO.

In another aspect of the present disclosure, the first type electrode and the third type electrode are cathodes. The first type electrode includes one of an activated carbon and lithium manganese oxide (LMO), and the third type electrode includes the other one of the activated carbon and LMO. The second type electrode is an anode comprising a $TiO_2$.

According to several aspects, battery having a plurality of electrodes immersed in a water-in-salt electrolytic solution is disclosed. The plurality of electrodes includes an activated carbon anode and an activated carbon cathode.

In an additional aspect of the present disclosure, the plurality of electrodes further includes a first pair of electrodes including a cathode and an anode sandwiching the 2 stack assembly thus forming a 4 stack assembly, the cathode is adjacent the activated carbon anode and the anode is adjacent the activated carbon cathode.

In another aspect of the present disclosure, the cathode includes one of an activated carbon and a LMO, and the anode includes one of an activated carbon and a $TIO_2$.

In another aspect of the present disclosure, the activated carbon anode and activated carbon cathode are sandwiched between a plurality of alternating cathodes and anodes. The cathodes include one of an activated carbon and a lithium manganese oxide (LMO) and the anodes include one of an activated carbon and a titanium dioxide ($TIO_2$).

In another aspect of the present disclosure, the water-in-salt electrolytic solution includes a sufficient amount of a lithium salt disposed in an aqueous solvent such that a lithium ion dissociated from the lithium salt within the aqueous solvent is solvated by greater than 1.5 but less than 4 water molecules.

According to several aspects, a battery having an aqueous electrolytic solution is disclosed. The aqueous solvent includes a plurality of water molecules and a molar amount of lithium salt sufficient such that a lithium ion dissociated from the lithium salt within the aqueous solvent is solvated by greater than 1.5 but less than 4 water molecules.

In an additional aspect of the present disclosure, the aqueous electrolytic solution includes at least 14 moles of the lithium salt per kg of aqueous solvent.

In another aspect of the present disclosure, the lithium salt includes at least one lithium salt selected from a group consisting of lithium bis(trifluoromethanesulphonyl)imide (LITFSI), lithium-trifluoromethanesulfonate ($LICF_3SO_3$), Magnesium Bis(trifluoromethanesulphonyl)imide (MgTFSI), Calcium Bis(trifluoromethanesulphonyl)imide (CaTFSI), Lithium Bis(oxalato)borate (LIBOB), Lithium Difluoro(oxalato)borate (LIDFOB), and Lithium Bis(fluorosulfonyl)imide (LIFSI).

In another aspect of the present disclosure, the battery further includes a plurality of electrodes. The plurality of electrodes includes an activated carbon anode sandwiched between a LMO cathode and an activated carbon cathode, or an activated carbon cathode sandwiched between an activated carbon anode and a $TiO_2$ anode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic representation of a first embodiment of a hybrid lithium ion capacitor battery;

FIG. 2 is a schematic representation of a second embodiment of a hybrid lithium ion capacitor battery;

DETAILED DESCRIPTION

Figure 3:
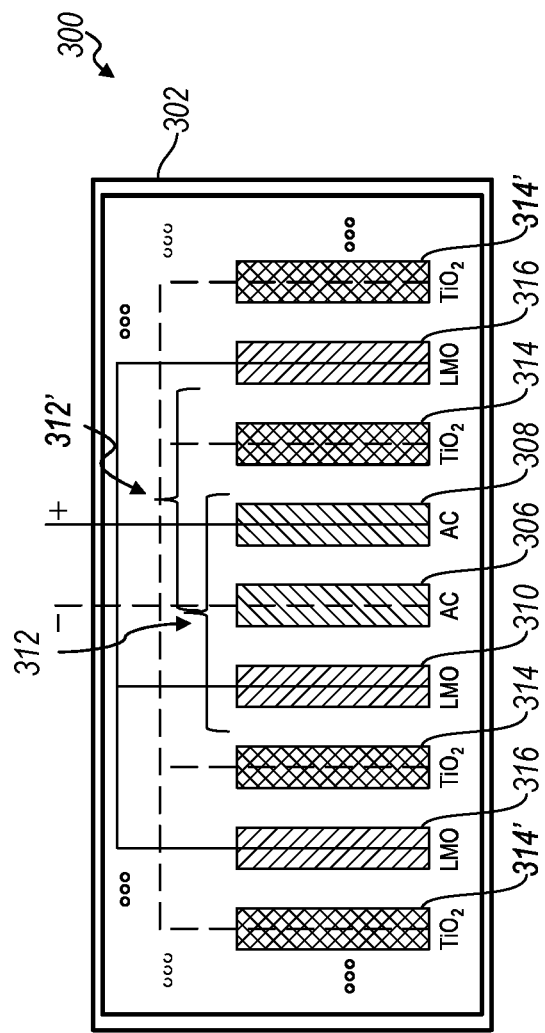
FIG. 3 is a schematic representation of a third embodiment of a hybrid lithium ion capacitor battery.

The following description is merely exemplary in nature and is not intended to limit the present disclosure, application, or uses. The illustrated embodiments are disclosed with reference to the drawings, wherein like numerals indicate like or corresponding parts throughout the several drawings. The figures are not necessarily to scale and some features may be exaggerated or minimized to show details of particular features. The specific structural and functional details disclosed are not to be interpreted as limiting, but as a representative basis for teaching one skilled in the art as to how to practice the disclosed concepts.

In general, a lithium ion battery is made up of a separator sandwiched between an anode and a cathode, a positive currently collector in electrical contact with the cathode, and a negative currently collector in electrical connection with the anode. The anode, cathode, and separator are immersed in an electrolytic solution, which carries positively charged lithium ions (Li+) between the anode to the cathode and vice versa through the separator. While the battery is discharging, the anode releases Li+ to the cathode. The movement of the Li+ creates free electrons in the anode which flows from the negative current collector through a device being powered (cell phone, computer, etc.) to the positive current collector. The separator blocks the flow of electrons inside the battery. When charging, the opposite happens where the Li+ are released by the cathode and received by the anode.

Activated carbon may be incorporated into the lithium ion battery to form a hybrid lithium ion capacitor battery, several embodiments of which are described in detail below. The separator is placed between the cathode and the activated carbon anode, or between the anode and the activated carbon cathode. An activated carbon layer may also be used as a cathode and/or anode. A water-in-salt electrolytic solution, which is described in detail below, is provided in the hybrid battery to carry the Li+ between the cathode and the anode through the separator. A portion of anions, such as $TFSI^-$, in the electrolytic solution is adsorbed onto the surface of the activated carbon layers adjacent the anode during a charging process. A portion of $Li^+$ is adsorbed onto the surface of the activated carbon layer adjacent the cathode during the charging process. During discharge of the battery, both the $TFSI^-$ and $Li^+$ de-adsorb from the respective activated carbon layers at a faster rate than from the cathode and anode respectively, thus giving the hybrid battery both excellent energy and power performance.

FIG. 1 shows a schematic representation of a hybrid lithium ion capacitor battery, according to a first embodiment, generally indicated by reference number 100 (herein "hybrid battery 100"). The hybrid battery 100 includes a battery housing 102 containing a battery cell stack 104. The battery cell stack 104 includes a first type electrode 106 sandwiched between a pair of second type electrodes 108 forming a 3-electrode cell stack 110. The 3-electrode cell stack 110 is sandwiched between a pair of third type electrodes 112 forming a 5-electrode cell stack 114. The 5-electrode cell stack 114 is sandwiched between a second pair of second type electrodes 108' forming a 7-electrode cell stack 116. The 7-electrode cell stack 116 is sandwiched between a pair of first type electrodes 106' forming the battery cell stack 104 having a total of 9 electrodes. While a 9-electrode battery cell stack 104 is disclosed, it should be appreciated that the hybrid battery 100 may include greater than 9 electrodes without departing from the scope of the present disclosure.

The second type electrode 108 are positive electrodes, or cathodes, and includes an embedded positive electrode current collector 124 that are electrically connected to a positive polarity tab 126. The positive electrode current collector 124 is preferably a thin-film aluminum foil that coextensively contacts the positive second type electrode 108. The second type electrodes 108 include one or more lithium-based active material that is capable of storing intercalated lithium. Examples of such lithium-based active materials include, but are not limited to, lithium manganese oxide (LMO), lithium cobalt oxide (LCO), lithium iron phosphate (LFP), lithium nickel manganese oxide (LNMO), lithium nickel manganese cobalt oxide (NCM), and lithium nickel cobalt aluminum oxide (NCA). One or more polymeric binder materials, such as polyvinyldiene fluoride (PVdF), an ethylene propylene diene monomer (EPDM) rubber, or a carboxymethoxy cellulose (CMC) may be intermingled with the lithium-based active material to provide the positive electrode with increased structural integrity.

The first type electrodes 106 and third type electrodes 112 are negative electrodes, or anodes, and includes one or more lithium host material that is capable of storing intercalated lithium at a lower electrochemical potential relative to the second type electrodes 108. The anodes include at least one lithium host material selected from a group comprising of activated carbon, titanium dioxide ($TiO_2$), Li4Ti5O12 (LTO), Vanadium-based material (such as VO2, LiV2O5, LiV3O8), transition metal oxide (such as MnO2, Fe2O3), Niobium-based material (such as TiNb2O7), LiTi2(PO4)3, Mo6S8, and TiS2. In the embodiment of the hybrid battery 100 shown, the first type electrode 106 includes an activated carbon and the third type electrode 112 includes a titanium dioxide ($TiO_2$). Each of the first type electrodes 106 and third type electrodes 112 includes an embedded negative electrode current collector 120 that are electrically connected to a negative polarity tab 128. The negative electrode current collector is preferably a thin-film copper or aluminum that coextensively contacts the respective first type electrodes 106 and the third type electrodes.

Separator layers (not shown) are disposed between the positive and negative electrodes. The separator layers function as an electrically insulating mechanical barrier layer that physically separate the electrodes to prevent short-circuiting of the hybrid battery 100. The separator layers are formed of one or more porous inert materials that has excellent wettability in a water-in-salt electrolytic solution, such as glass fibers and paper. The battery cell stack 104 is immersed in a sufficient amount of water-in-salt electrolytic solution to impregnate the electrodes and the separator layers.

FIG. 2 shows a schematic representation of a hybrid lithium ion capacitor battery, according to a second embodiment, generally indicated by reference number 200. The hybrid battery 200 includes a battery housing 202 containing a battery cell stack 204. The battery cell stack 204 includes a first type electrode 206 sandwiched between a pair of second type electrodes 208 forming a 3-electrode cell stack 210. The 3-electrode cell stack 210 is sandwiched between a pair of third type electrodes 212 forming a 5-electrode cell stack 214. The 5-electrode cell stack 214 is sandwiched between a second pair of second type electrodes 208' forming a 7-electrode cell stack 216. The 7-electrode cell stack 216 is sandwiched between a pair of first type electrodes 206' forming the battery cell stack 204 having a total of 9 electrodes. While a 9-electrode battery cell stack 204 is disclosed, it should be appreciated that the hybrid battery 200 may include greater than 9 electrodes without departing from the scope of the present disclosure.

The second type electrode 208 are negative electrodes and includes an embedded negative electrode current collector 224 that are electrically connected to a negative polarity tab 226. The negative electrode current collector 224 is preferably a thin-film copper or aluminum foil that coextensively contacts the negative second type electrode 208. The second type electrodes include one or more lithium-based active material that is capable of storing intercalated lithium. Examples of such lithium-based active materials include, but are not limited to, titanium dioxide ($TiO_2$).

The first type electrodes 206 and third type electrodes 212 are positive electrodes, or cathodes. The first type electrodes 206 and third type electrodes 212 includes one or more lithium host material that is capable of storing intercalated lithium. The first type electrode 206 includes an activated carbon layer and the third type electrode 212 includes a lithium based metal oxide, preferably lithium manganese oxide (LMO). Each of the first type electrodes 206 and third type electrodes 212 includes an embedded positive electrode current collector 220 that are electrically connected to a positive polarity tab 228. The positive electrode current collector 220 is preferably a thin-film aluminum foil that coextensively contacts the respective first type electrodes 206 and the third type electrodes 212.

FIG. 3 shows a schematic representation of a hybrid lithium ion capacitor battery, according to a third embodiment, generally indicated by reference number 300. The hybrid battery 300 includes housing 302 containing an activated carbon anode 306 adjacent to an activated carbon cathode 308. A LMO cathode 310 is adjacent the activated carbon anode thus defining a 3-electrode cell stack 312. The 3-electrode cell stack 312 is sandwiched between two $TiO_2$ anodes 314, which is in turn is sandwiched between a pair of LMO cathodes 316, which is in turn sandwiched between another pair of $TiO_2$ anodes 314'. While a 9-electrode battery cell stack 304 is disclosed, it should be appreciated that the hybrid battery 300 may include greater than 9 electrodes without departing from the scope of the present disclosure.

Alternatively the activated carbon cathode 308 may be sandwiched between the activated carbon anode 306 and the $TiO_2$ anode 314 to define 3-electrode cell stack 312'. The 3-electrode cell stack 312' may be sandwiched between a pair of LMO cathodes 310, 316, which may be sandwiched between a pair of $TiO_2$ anodes 314, 314' and so on and so forth.

The electrode cell stacks of the above disclosed various configurations of a hybrid lithium ion capacitor battery may be assembled on a rotatable stacking platform. A first type electrode is placed on the rotatable stacking platform. A continuous separator sheet is then placed onto the first type electrode thus covering the first type electrode. The stacking platform having the first type electrode and the separator sheet is wound 180 degree. A selected first, second, or third type electrode is placed on a portion of separator sheet advanced from the winding of the platform. The selected first, second, or third type electrode and the separator sheet is wound 180 degrees about the rotational A-axis. Another selected first, second, or third type electrode is placed on a portion of separator advanced from the winding of the platform and wound 180 degrees. This process is repeated with the desired first, second, and/or third type electrodes until a battery cell stack having the desired electrode type configuration is assembled.

Figure 4:
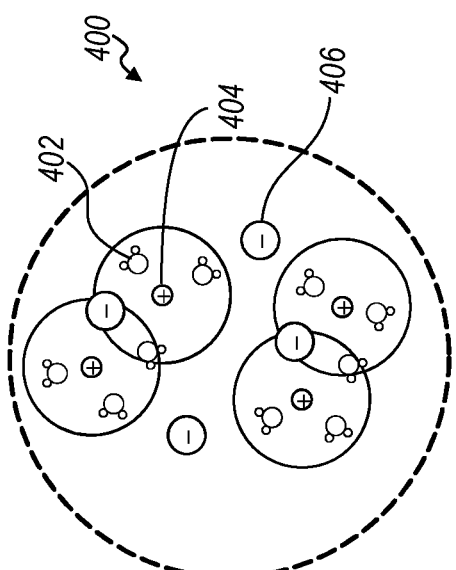
FIG. 4 is a diagrammatic representation of a magnified view of a water-in-salt electrolytic solution for a hybrid ion capacitor battery.

FIG. 4 shows a diagrammatic representation of a magnification of a water-in-salt electrolytic solution 400 having water molecules 402 surrounding $Li^+$ 404 and associated anions 406 disassociated from a lithium salt. A solvation number is the number of solvent molecules surrounding and interacting with a solute species. In this case, the solvent molecules are $H_2O$ molecules and the solute species are $Li^+$ and associated anions. The concentration of lithium salt in the water solvent is sufficiently high to provide a solvation number of less than 4, meaning there are less than four (4) $H_2O$ molecules surrounding and interacting with a Li+. It is preferable that the minimum and maximum solvation number is from 1.5 to less than 4. In other words, it is preferred that the ratio between the $H_2O$ molecules and $Li^+$ ions in the water-in-salt electrolytic solution is from 1.5 to less than 4. It is preferable to have at least 14 moles of lithium salts per 1 Kg of water based on 1 $Li^+$ in a lithium salt molecule. The water-in-salt electrolytic solution 400 may be a single lithium salt system, meaning a single type of lithium salt in the water-in-salt electrolytic solution 400. The water-in-salt electrolytic solution 400 may include more than one type of lithium salts forming a binary or more salts system.

In dilute solutions having less than 5 moles of lithium salt per Kg of water, the abundance of water provides a conventional solvation sheath structure in which there would be four (4) $H_2O$ molecules per Li+ in the primary sheath and additional four (4) $H_2O$ in the loosely bound secondary sheath. The adjacent $Li^+$ and associated anions, such as $TFSI^-$, are well separated by the plentiful $H_2O$ molecules. When the lithium salt concentration is increases to greater than 10 moles per Kg of water, the insufficient H2O molecule population leads to a drastic change in $Li^+$ solvation sheath structure. In particular, at 21 moles of lithium salt per Kg of water, or greater, there are only 2.6 $H_2O$ molecules per $Li^+$ or even less, which can no longer effectively neutralize the electrostatic field created by the formal charge on the $Li^+$. Consequently, the $TFSI^-$ anion enters the $Li^+$ solvation sheath, leading to intimate $Li^+$ ion and $TFSI^-$ interactions.

Traditional inorganic salts based aqueous electrolytic solutions have narrow voltage window due to the degradation of H2O, specifically, the oxygen evolution reaction at the anodic process and hydrogen evolution reaction at the cathodic process. The water-in-salt electrolytic solution of the current disclosure enables the enlargement of the electrochemical stability window over the traditional inorganic salts based aqueous electrolytic solutions. The water-in-salt electrolytic solution enables a larger electrochemical stability window, thus allowing for a greater variety of active materials that can be used for the cathodes and anodes for increasing the energy density of the battery.

The factors in choosing the organic lithium salts includes three factors: first, the lithium salts requires to have a high solubility to make water-in-salt concept realize; second, the lithium salts should be capable of tolerating the high oxidation voltage, i.e. greater than 4.3 volts (V); and third, the anion in the salts can be reduced at the voltage higher than hydrogen evolution reaction voltage (2.21 V to 3.04 V versus Li, depending on the pH value and concentration) to form passivation layer at anode side so as to suppress degradation of $H_2O$. The water-in-salt electrolytic solution may be extended into a single, binary or other lithium salts systems. The voltage stability windows can be tailored by adjusting concentration of the electrolytes or by adding smaller quantities of secondary lithium salts as compared to the primary lithium salt. Preferred lithium salts include, but not limited to, one or more of the following: lithium bis (trifluoromethanesulphonyl)imide (LITFSI), lithium-trifluoromethanesulfonate ($LICF_3SO_3$), Magnesium bis(trifluoromethanesulphonyl)imide (MgTFSI), Calcium bis (trifluoromethanesulphonyl)imide (CaTFSI), Lithium bis (oxalato)borate (LIBOB), Lithium Difluoro(oxalato)borate (LIDFOB), and Lithium Bis(fluorosulfonyl)imide (LIFSI). The desired voltage window can be tailored by changing the concentrations of the lithium salt or various lithium salts in the aqueous solution.

Figure 6:
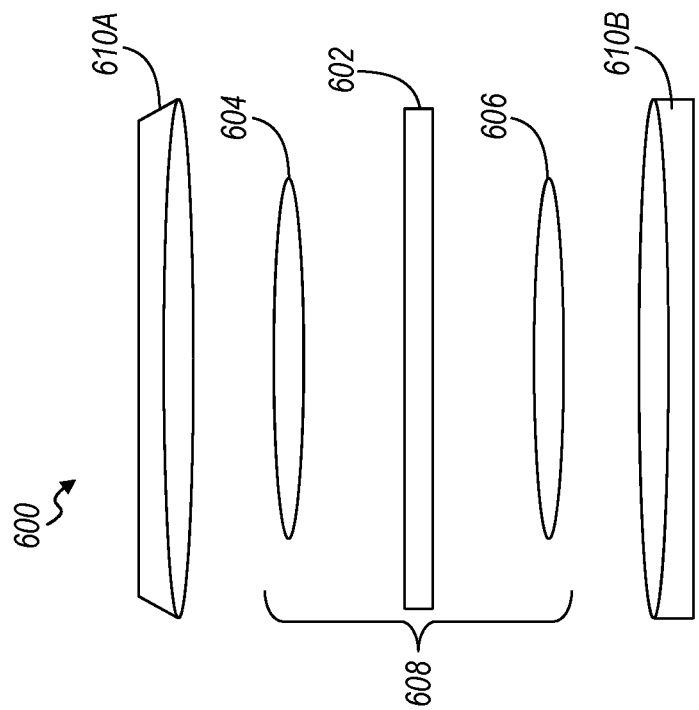
FIG. 6 is a diagrammatic representation of a coin battery cell used to test various combinations of cathodes and anodes with a water-in-salt electrolytic solution.
Figure 5:
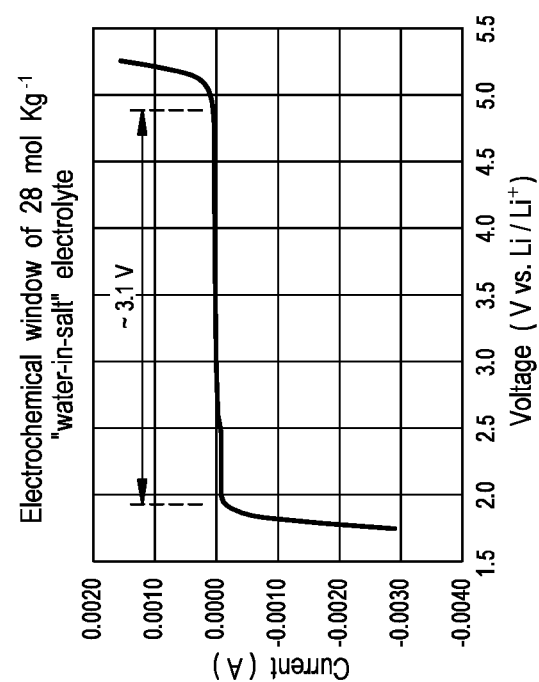
FIG. 5 is an electrochemical window profile graph of an exemplary water-in-salt electrolytic solution for a hybrid ion capacitor battery.

FIG. 5 shows a water-in-salt electrolytic solution having 28 moles of a lithium salt per Kg of H2O having a stable electrochemical window of approximately 3.1 V. The water-in-salt electrolytic solution was tested in a laboratory setting using a coin battery 600, an exploded view of which is shown in FIG. 6. The coin battery includes a separator layer 602 sandwiched between a cathode layer 604, and an anode layer 606 defining a battery cell 608. The battery cell 608 is encased within an upper and lower battery shell 610A, 610B and a sufficient amount of aqueous electrolytic solution is disposed within the closed battery shell 610 to immerse the battery cell 608.

Figure 7:
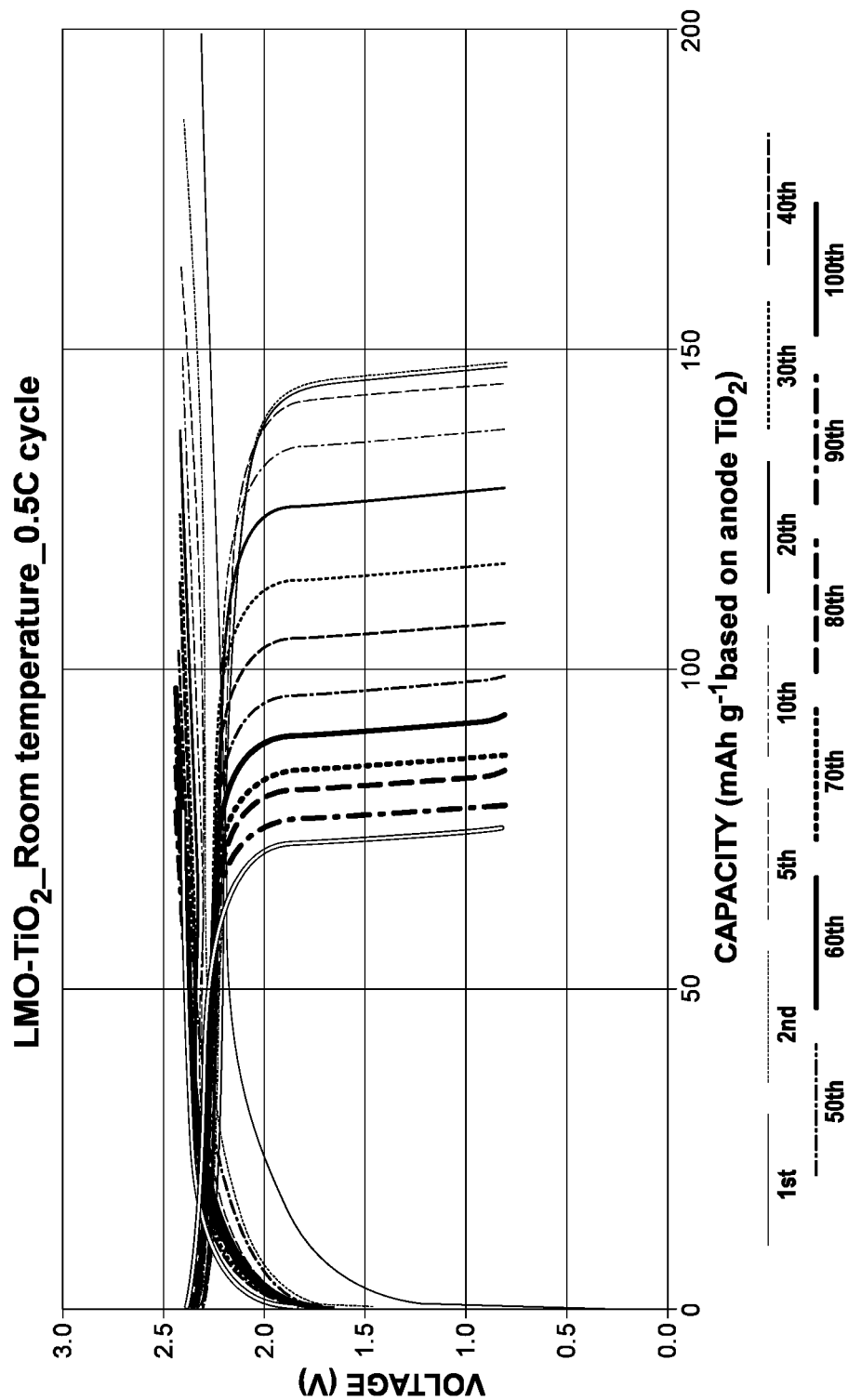
FIG. 7 through FIG. 10 are charge-discharge profiles of the coin battery cell of FIG. 6 testing the various combinations of cathodes and anodes with a water-in-salt electrolytic solution.
Figure 8:
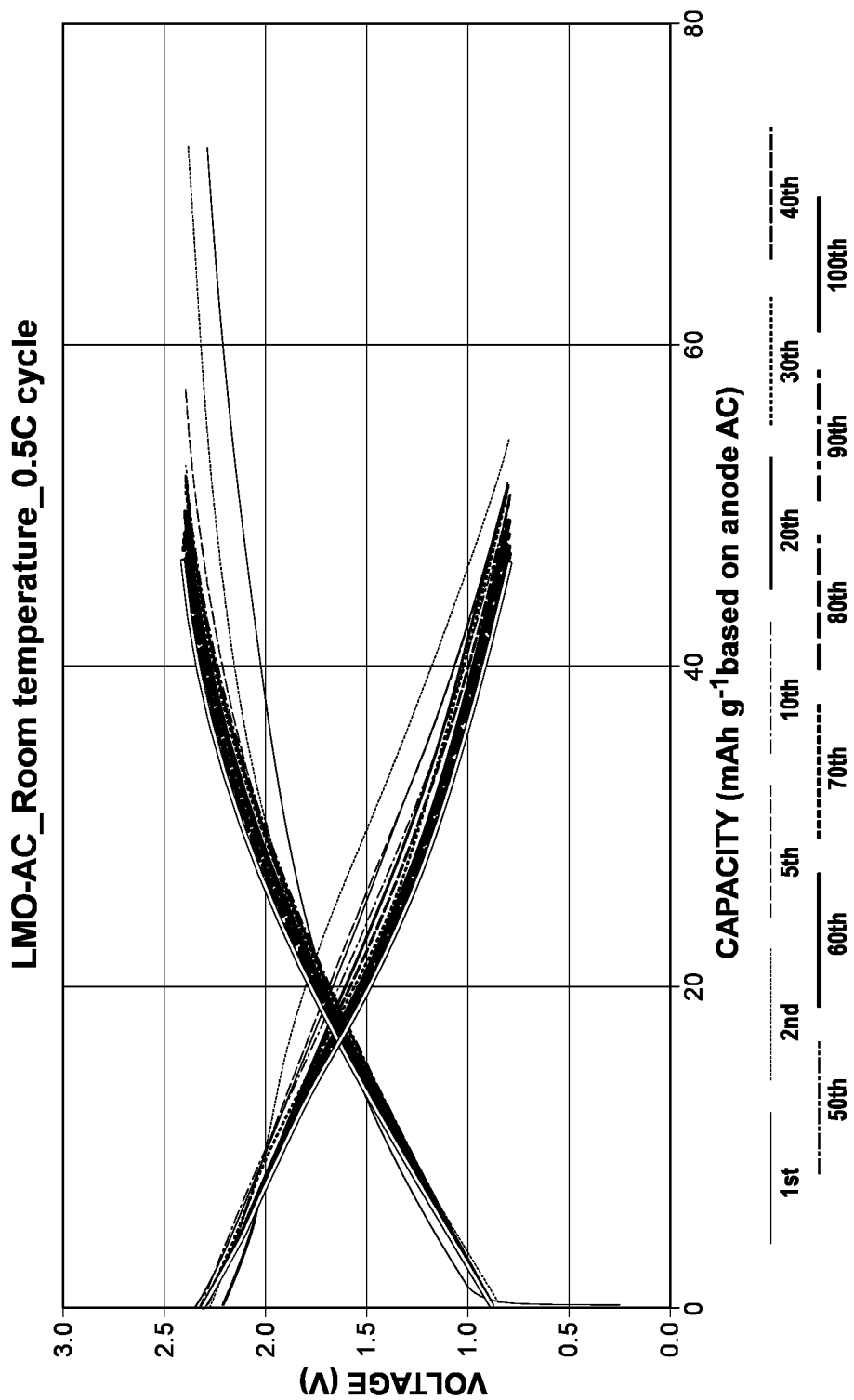
Figure 9:
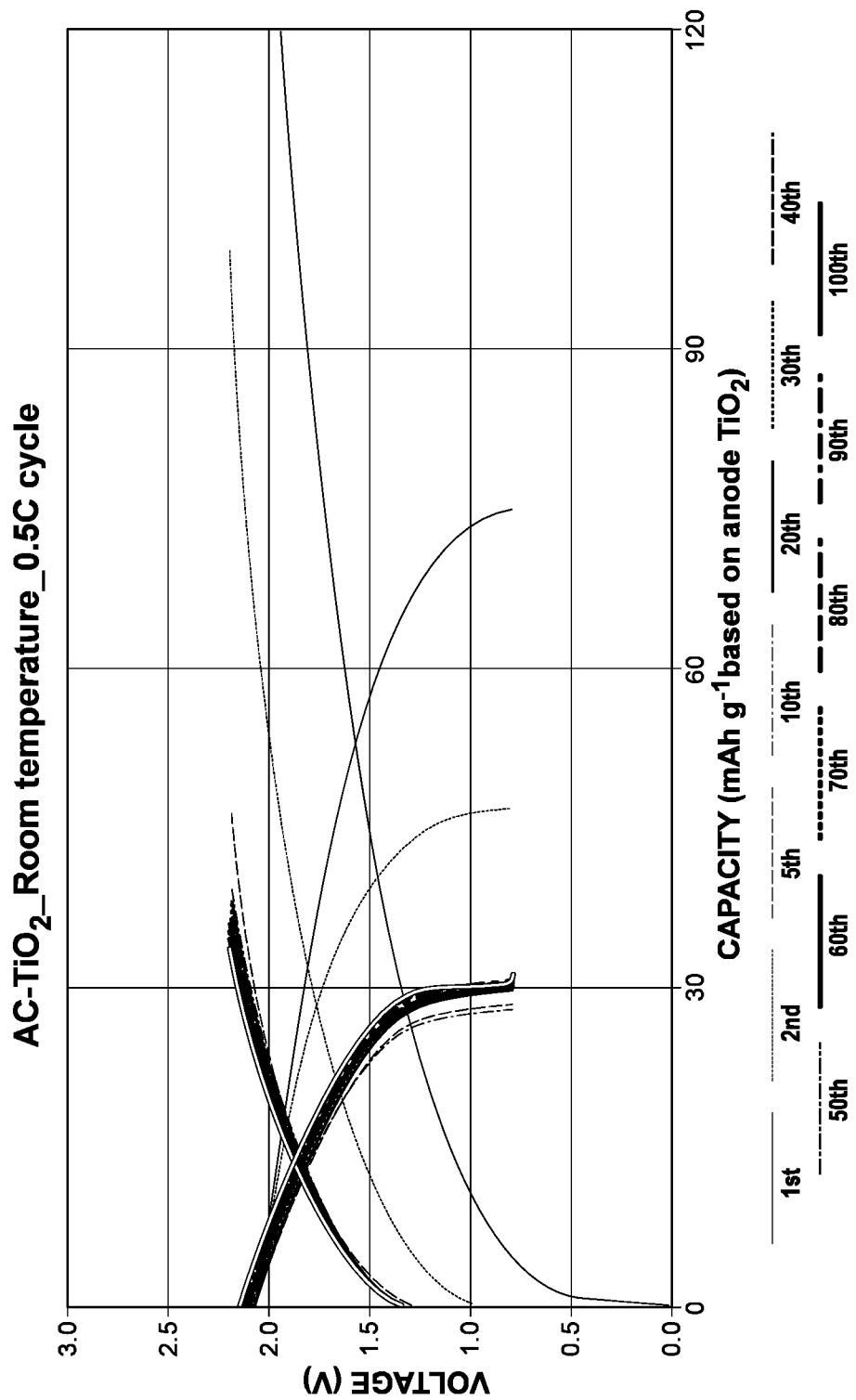
Figure 10:
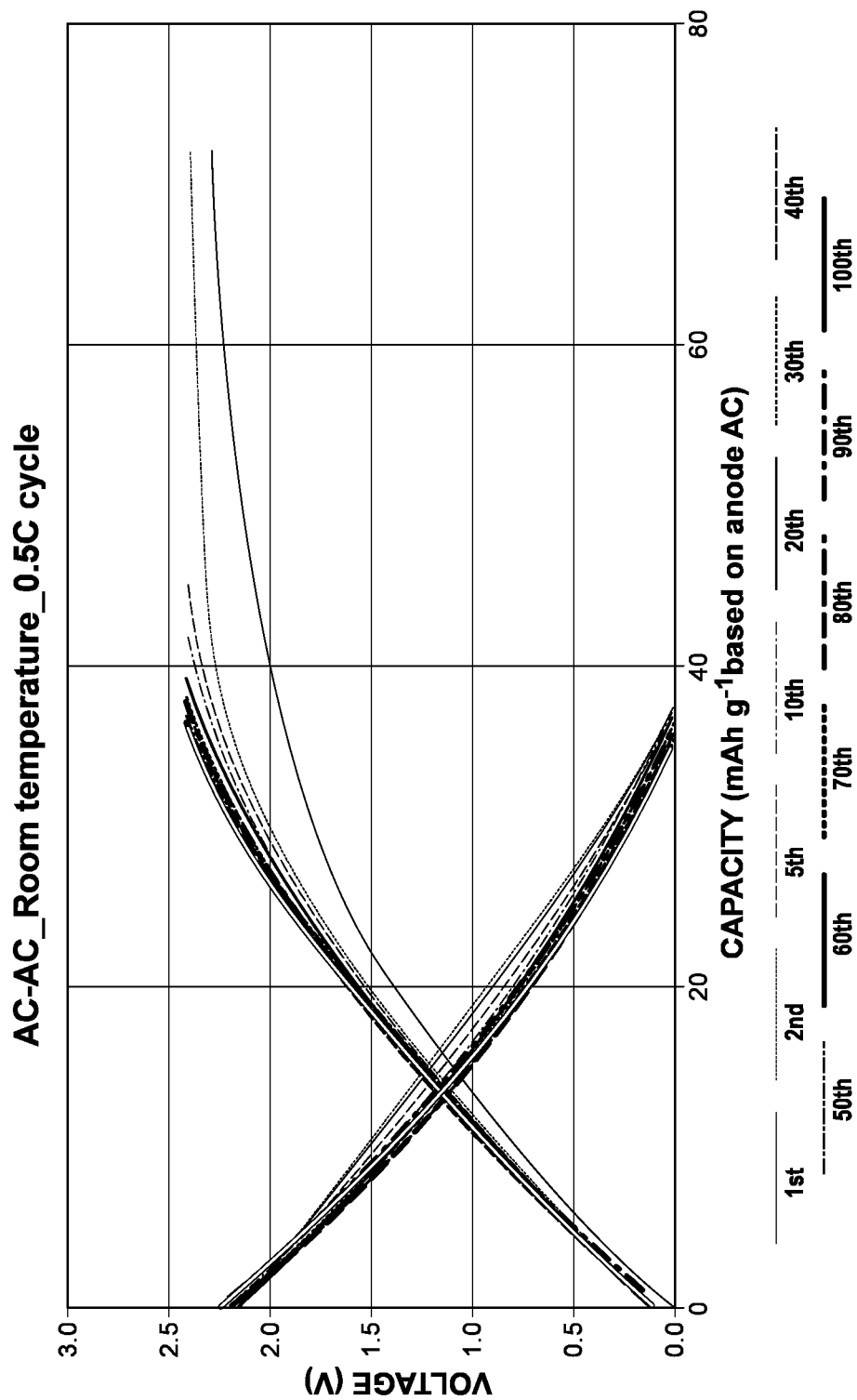

FIG. 7 shows a charging and discharging graph of the coin battery 600 of FIG. 6, wherein the cathode layer 604 include lithium manganese oxide (LMO) and the anode layer 606 includes titanium dioxide ($TiO_2$). Similarly, FIG. 8 shows a charging and discharging graph of the coin battery 600 of FIG. 6, wherein the cathode layer 604 includes a LMO and the anode layer 606 includes activated carbon. FIG. 9 shows a charging and discharging graph of the coin battery 600 of FIG. 6, wherein the cathode layer 604 includes an activated carbon and the anode layer 606 includes $TiO_2$. FIG. 10 shows a charging and discharging graph of the coin battery 600 of FIG. 6, wherein both the cathode layer 604 and anode layer 606 includes activated carbon. The coin battery 600 having the above various combinations of active materials on the cathode layers 604 and anode layers 606 shown in FIG. 7 through FIG. 10 are repeatedly charged at room temperature at 0.5 C cycle and discharged for 100 cycles. The performance of each charging and discharging event are shown in the graphs. The graphs shows the repeatability and consistent performance of the coin battery 600 over the 100 charging and discharging cycles.

Figures 11, 12:
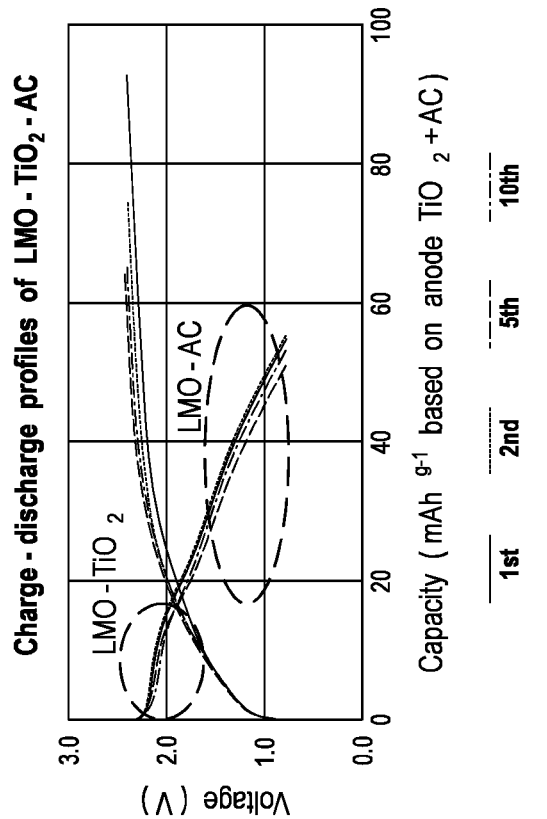
FIG. 11 is a diagrammatic representation of a hybrid lithium battery having an activated carbon electrode immersed in a water-in-salt electrolytic solution.
FIG. 12 is a charge-discharge profiles of the beaker battery of FIG. 11.

FIG. 11 shows a beaker battery 1100 having three (3) electrodes deposed in a water-in-salt solution 1101 having 21 moles of LiTFSI and 7 moles of $LiCF_3SO_3$ per 1 Kg $H_2O$. The 3 three electrodes include a $TiO_2$ electrode 1102, a LMO electrode 1104, and an activated carbon electrode 1106. Both the $TiO_2$ electrode 1102 and activated carbon electrode 1106 are anodes and the LMO electrode 1104 is a cathode. The 3-electrode battery was charged and discharged 10 cycles. FIG. 12 shows the charge-discharge profile of the 3 electrode battery of FIG. 11. Referring to the discharge charge curve, the upper left hand portion of the discharge curve shows the characteristic of the LMO-$TiO_2$ electrodes and the lower right hand portion of the discharge curve shows the characteristics of the LMO-AC electrodes. FIG. 8, FIG. 10, and FIG. 12 show the desirable performances and the repeatability of the charge/discharge cycles of embodiments of hybrid lithium ion capacitor batteries using the water-in-salt electrolytic solution disclosed herein.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery comprising a plurality of electrodes immersed in a water-in-salt electrolytic solution, wherein the water-in-salt electrolytic solution comprises a sufficient amount of a lithium salt disposed in an aqueous solvent such that a lithium ion dissociated from the lithium salt within the aqueous solvent is solvated by less than 4 water molecules;
   wherein the plurality of electrodes comprises:
      a first type electrode, and
      a pair of second type electrodes, wherein the first type electrode is sandwiched between the pair of the second type electrodes thus forming a 3 electrode stack assembly;
      wherein the first type electrode includes one of an activated carbon and a titanium dioxide ($TIO_2$); and
      wherein the second type electrodes include one of a lithium manganese oxide (LMO) and the $TiO_2$.

2. The battery of claim 1, further comprising a pair of third type electrodes sandwiching the 3 electrode stack assembly thus forming a 5 electrode stack assembly, wherein the third type electrode comprises the other one of the activated carbon and the $TiO_2$.

3. The battery of claim 2 wherein the first type electrode and the third type electrode are anodes.

4. The battery of claim 2 wherein the first type electrode and the third type electrode are cathodes.

5. A battery comprising:
a plurality of electrodes defining a 2 stack assembly immersed in a water-in-salt electrolytic solution, wherein the plurality of electrodes includes:
an activated carbon anode, and
an activated carbon cathode.

6. The battery of claim 5, wherein the plurality of electrodes further comprises:
a first pair of electrodes comprising a cathode and an anode sandwiching the 2 stack assembly thus forming a 4 stack assembly,
wherein the cathode is adjacent the activated carbon anode and anode is adjacent the activated carbon cathode.

7. The battery of claim 6, wherein the cathode includes one of an activated carbon and a LMO, and wherein the anode includes one of an activated carbon and a $TIO_2$.

8. The battery of claim 5, wherein the activated carbon anode and activated carbon cathode are sandwiched between a plurality of alternating cathodes and anodes, wherein the cathodes include one of an activated carbon and a LMO, and the anodes include the other of an activated carbon and a $TIO_2$.

9. The battery of claim 5 wherein the water-in-salt electrolytic solution comprises a sufficient amount of a lithium salt disposed in an aqueous solvent such that a lithium ion dissociated from the lithium salt within the aqueous solvent is solvated by greater than 1.5 but less than 4 water molecules.

10. A battery comprising:
an aqueous electrolytic solution comprising:
an aqueous solvent comprising of water molecules;
a plurality of electrodes including one of: (i) an activated carbon anode sandwiched between a lithium manganese oxide (LMO) cathode and an activated carbon cathode, and (ii) an activated carbon cathode sandwiched between an activated carbon anode and a titanium dioxide ($TiO_2$) anode; and
a lithium salt;
wherein the lithium salt includes a molar amount sufficient such that a lithium ion dissociated from the lithium salt within the aqueous solvent is solvated by greater than 1.5 but less than 4 water molecules.

11. The battery of claim 10, wherein the aqueous electrolytic solution comprises at least 14 moles of the lithium salt per kg of aqueous solvent.

12. The battery of claim 10, wherein the lithium salt includes at least one lithium salt selected from a group consisting of lithium bis(trifluoromethanesulphonyl)imide (LITFSI), lithium-trifluoromethanesulfonate (LICF$_3$SO$_3$), Magnesium Bis(trifluoromethanesulphonyl)imide (MgTFSI), Calcium Bis(trifluoromethanesulphonyl)imide (CaTFSI), Lithium Bis(oxalato)borate (LIBOB), Lithium Difluoro(oxalato)borate (LIDFOB), and Lithium Bis(fluorosulfonyl)imide (LIFSI).

* * * * *